Aug. 19, 1969     W. A. GINDELE     3,461,590
DEVICE FOR ATTACHING A SHRIMP-LIKE BODY TO A FISHING HOOK
Filed Sept. 16, 1968
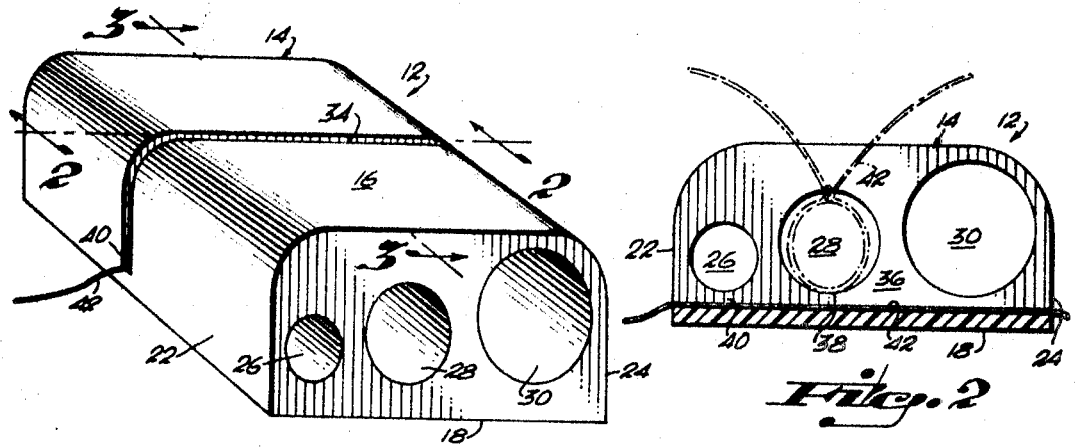
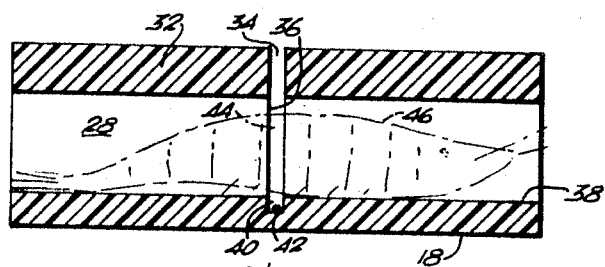
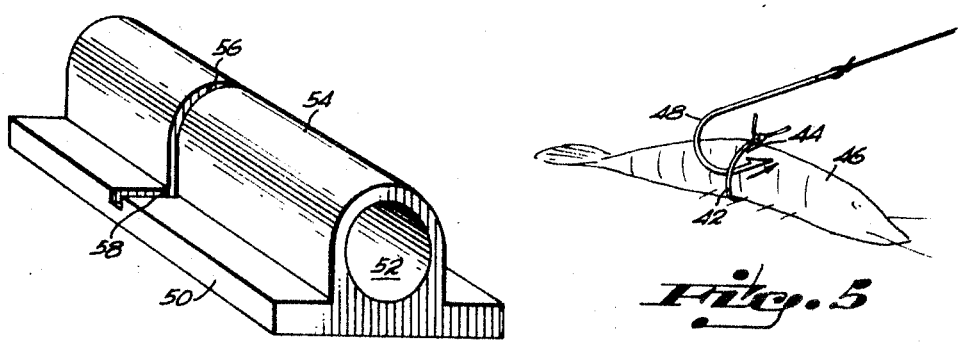
INVENTOR.
WOODBURY A. GINDELE
BY
John Cyril Malloy
ATTORNEY.

United States Patent Office 3,461,590
Patented Aug. 19, 1969

3,461,590
DEVICE FOR ATTACHING A SHRIMP-LIKE BODY TO A FISHING HOOK
Woodbury A. Gindele, 515 SW. 64th Ave., Miami, Fla. 33144
Filed Sept. 16, 1968, Ser. No. 762,255
Int. Cl. A01k 97/00, 83/06
U.S. Cl. 43—4                                                  7 Claims

ABSTRACT OF THE DISCLOSURE

A device for use in tying a line about the mid-point of a shrimp-like body which includes a body member having a socket to receive the shrimp-like body and a slot extending across the body so as to be circumposed completely around the socket for receiving a string before a shrimp is placed in the socket. The string is then tied about the body of the shrimp and the body is then withdrawn from the socket to accommodate attachment to the hooked end of a fishing line without severe injury to the shrimp.

---

As is perhaps well known, in fishing it is often desirable to use shrimp as bait; however, when a hook is used to attach directly to the body of the shrimp, the shrimp does not live long and the bait is not active. Additionally, it is quite difficult to place a shrimp on a hooked end of a line because the shrimp is difficult to handle and wiggles extensively. To overcome this, many fishermen keep the shrimp in ice until ready for use, whereupon the shrimp are removed, hooked and placed in the water. This latter procedure has the disadvantage of a relatively inactive bait.

The present invention provides for a simple and inexpensive tool or device for use by a fisherman for tying a string about the mid-section of a shrimp so that the hook can be passed between the tightly drawn string about the body and the outer surface of the shrimp body to secure the shrimp body to the hook while not injuring the shrimp, so that there is thus provided a live and active bait.

It is, accordingly, an object of this invention to provide a device for use in attaching a shrimp-like body to a fish hook wherein a housing is provided in which there is a socket having an open end to receive a shrimp body and wherein the housing includes a slot in a plane perpendicular to the center line of the socket and extending from one surface of the housing across the socket diameter and toward but not to the opposite surface so that a line may be laid in the recess defined by the slot so that once a shrimp has been placed in the socket, the line may be tied about the mid-point of the shrimp body and the shrimp body removed from the socket and a line attached to it by passing the hooked end of a fishing line between the string tied about the mid-section and the body of the shrimp.

It is another object of this invention to provide an improved device for use by fishermen which is simple and inexpensive to manufacture, is light in weight, and is adapted to be used with a minimum amount of effort for securing a shrimp-like body to the hooked end of a fishing line.

In accordance with these and other objects which will become apparent hereinafter, the instant invention will now be described with reference to the accompanying drawings in which:

FIGURE 1 is a perspective view of the device;
FIGURE 2 is a view taken along the plane indicated by the line 2—2 of FIGURE 1 and looking in the direction of the arrows;
FIGURE 3 is a view taken along the plane indicated by the line 3—3 of FIGURE 1 and looking in the direction of the arrows;
FIGURE 4 is a perspective view of an alternative embodiment of the instant invention; and
FIGURE 5 is a perspective view illustrating the attachment of the shrimp processed in accordance with this invention to the hook end of a line for use in fishing.

Referring to the drawings, wherein like reference characters designate like or corresponding parts throughout the different views, and referring particularly to FIGURE 1, the device is generally designated by the numeral 12 and is seen to include a housing 14 having a top surface 16 and a base surface 18 and opposite side walls 22 and 24. Extending through the housing there are a plurality of differently sized sockets, such as 26, 28 and 30, with each of the sockets being cylindrical and lying within the solid mass 32 of the housing and open at least at one end and preferably at both ends as shown in FIGURE 3. A slot 34 is provided perpendicular to the center line length of the sockets and in a central zone 36 of the socket length. The slot extends from the top surface 16 across or through a portion of the central zone of the housing toward but not to the base surface 18 but slightly past the base side wall 38 of the device, whereby there is defined a recess 40 circumposed completely around the socket. A thin length of line 42 is positioned in the slot as seen in FIGURE 1 and in FIGURE 3. Thereafter, a shrimp-like body is inserted in the socket which is closest to the size of the shrimp and the shrimp body is generally centered with respect to the plane of the slot. The line 42 is then tied about the central zone 44 of the shrimp body 46 in the manner indicated in FIGURE 5, and the ends of the line, after the knot has been made, are cut. Thereafter, the shrimp body 46 is removed from the socket and the hook 48 is inserted between the exterior surface of the shrimp body and the knotted line 42.

The housing may be made of any suitable material; however, molded plastic material is lightweight and highly desirable. As indicated in the drawing, various size sockets may be utilized or one main socket as seen in the embodiment of FIGURE 4 which includes an enlarged base portion 50 and a central socket 52 extending from the top surface 54 with the slot 56 being intermediate the length of the socket and located at about the mid-point and extending across the body of the housing from the top surface beyond the base side wall of the socket so as to define the recess 58 to receive a line. While the top surface 16 of the housing completely covers the socket, the socket as defined in this invention is to be considered as a confining cradle for a shrimp body which is accessible exteriorly of the body for positioning the shrimp therein, and, thus, it is recognized within the scope of this invention that the top surface may be modified to define an opening whereby a shrimp body may be received within the cradle or socket instead of passing it into the socket; however, the construction shown in the drawings is the preferred embodiment since it is adapted for molded plastic construction.

What is claimed is:
1. For use by a fisherman, a device for attaching a shrimp-type body to a fish hook and for tying a string about the body of a shrimp comprising:
   a housing having a top surface and a base surface and a cylindrical socket in the housing between the surfaces and with an open end to receive a shrimp body within the socket,
   said housing having a slot in a plane generally perpendicular to the center line of the socket and in the central zone of the housing about the socket length, said slot extending from the top surface across the housing toward but not to the base surface and beyond the base of the side wall of the socket to define a recess circumposed completely around the socket, whereby a string may be placed in the slot and a shrimp-type body positioned in the socket with the medial plane of the shrimp-type body being at about the slot and the string may be tied tightly around the mid-section of the shrimp-type body and the shrimp-type body removed from the socket and adapted for attachment to the hook end of a line by passing the hook between the string and the shrimp body.

2. The device as set forth in claim 1 wherein the open end of the socket is in a plane generally parallel to that of the slot and the top surface overlays the socket surface defining a cradle to receive a shrimp body.

3. The device as set forth in claim 1 wherein the socket is open at opposite ends of the housing.

4. The device as set forth in claim 1 wherein said housing includes a plurality of parallel cylindrical sockets each of a different diameter to receive different size shrimp bodies.

5. The device as set forth in claim 1 wherein said device is of molded plastic material.

6. The device as set forth in claim 1 wherein said housing includes an enlarged base portion opposite said top surface and a single socket.

7. The process of securing a shrimp type body to a hooked end of a fishing line by use of a housing including a socket type cradle and having a recess around the cradle, comprising the steps of:

first, placing a string in the recess and extending outwardly of the cradle, second positioning a shrimp-type body in the cradle with the mid-section of the body at about the recess and then tying the ends of the string about the mid-section of the body in tight relation, whereby the shrimp may be attached to a fisherman's line by passing the hooked end between the tied string and the body.

References Cited

UNITED STATES PATENTS

| | | | |
|---|---|---|---|
| 2,531,551 | 11/1950 | Brecht et al. | 43—4 |
| 2,671,979 | 3/1954 | Jones | 43—53.5 |
| 2,880,545 | 4/1959 | Stadler | 43—4 |
| 3,197,912 | 8/1965 | Kramer | 43—44.4 |
| 3,398,477 | 8/1968 | Paluzzi | 43—44.4 |

WARNER H. CAMP, Primary Examiner

U.S. Cl. X.R.

43—4.5, 44.4